US008675794B1

(12) United States Patent
Perets et al.

(10) Patent No.: US 8,675,794 B1
(45) Date of Patent: Mar. 18, 2014

(54) EFFICIENT ESTIMATION OF FEEDBACK FOR MODULATION AND CODING SCHEME (MCS) SELECTION

(75) Inventors: Yona Perets, Ra'anana (IL); Daniel Yellin, Ra'anana (IL); Ezer Melzer, Tel Aviv (IL)

(73) Assignee: Marvell International Ltd., Hamilton (BM)

( * ) Notice: Subject to any disclaimer, the term of this patent is extended or adjusted under 35 U.S.C. 154(b) by 656 days.

(21) Appl. No.: 12/902,168

(22) Filed: Oct. 12, 2010

Related U.S. Application Data

(60) Provisional application No. 61/251,213, filed on Oct. 13, 2009, provisional application No. 61/371,098, filed on Aug. 5, 2010.

(51) Int. Cl.
*H04B 1/10* (2006.01)

(52) U.S. Cl.
USPC ........... 375/349; 375/225; 375/227; 375/264; 375/284; 375/346

(58) Field of Classification Search
USPC .......... 375/224–228, 259–300, 316, 322–350
See application file for complete search history.

(56) References Cited

U.S. PATENT DOCUMENTS

| | | | |
|---|---|---|---|
| 5,231,629 A | 7/1993 | Kotzin et al. | |
| 5,349,567 A * | 9/1994 | Reed | 367/100 |
| 5,940,439 A | 8/1999 | Kleider et al. | |
| 6,466,904 B1 | 10/2002 | Gao et al. | |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,839,944 B2 | 11/2010 | Lee et al. | |
| 7,941,186 B2 | 5/2011 | Cho et al. | |
| 8,036,286 B2 | 10/2011 | Lee et al. | |
| 8,068,555 B2 | 11/2011 | Jongren | |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

Huang et al., "A Limited Feedback Precoding System with Hierarchical Codebook and Linear Receiver", IEEE Transactions on Wireless Communications, vol. 7, No. 12, pp. 4843-4848, Dec. 2008.

(Continued)

*Primary Examiner* — Sam K Ahn
*Assistant Examiner* — James M Perez (57) ABSTRACT

A method includes receiving reference signals in a mobile communication terminal, which is designed to receive data-carrying signals that are transmitted from a base station using one of multiple predefined Modulation and Coding Schemes (MCSs). One or more pre-calculated mappings between Signal-to-Noise Ratio (SNR) and error rate for one or more of the MCSs are held in the communication terminal. The pre-calculated mappings are adjusted according to one or more transmission parameters of the data-carrying signals. Measures indicative of respective actual spectral efficiencies that are achievable by the MCSs are estimated based on the adjusted mappings using the received reference signals. A preferred MCS is selected based on the estimated measures, and feedback that is indicative of the preferred MCS is sent to the base station.

18 Claims, 5 Drawing Sheets

(56) References Cited

U.S. PATENT DOCUMENTS

| | | | |
|---|---|---|---|
| 8,098,750 B2 | 1/2012 | Mueck et al. | |
| 8,179,775 B2 | 5/2012 | Chen et al. | |
| 8,325,844 B2 | 12/2012 | Walton et al. | |
| 2003/0035491 A1 | 2/2003 | Walton et al. | |
| 2005/0141630 A1 | 6/2005 | Catreux et al. | |
| 2005/0157810 A1 | 7/2005 | Raleigh et al. | |
| 2005/0237920 A1 | 10/2005 | Howard et al. | |
| 2005/0250544 A1 | 11/2005 | Grant et al. | |
| 2006/0014554 A1 | 1/2006 | Gerlach | |
| 2006/0056538 A1 | 3/2006 | Nam et al. | |
| 2006/0093060 A1 | 5/2006 | Jung et al. | |
| 2006/0114858 A1* | 6/2006 | Walton et al. | 370/335 |
| 2006/0153112 A1 | 7/2006 | Lim et al. | |
| 2006/0203777 A1 | 9/2006 | Kim et al. | |
| 2006/0233131 A1 | 10/2006 | Gore et al. | |
| 2006/0276212 A1 | 12/2006 | Sampath et al. | |
| 2007/0058746 A1 | 3/2007 | Gueguen | |
| 2007/0076810 A1* | 4/2007 | Herrera et al. | 375/261 |
| 2007/0099578 A1 | 5/2007 | Adeney et al. | |
| 2007/0149229 A1 | 6/2007 | Frederiksen et al. | |
| 2007/0153731 A1 | 7/2007 | Fine | |
| 2007/0160162 A1 | 7/2007 | Kim et al. | |
| 2007/0165738 A1 | 7/2007 | Barriac et al. | |
| 2007/0223422 A1 | 9/2007 | Kim et al. | |
| 2007/0223423 A1 | 9/2007 | Kim et al. | |
| 2007/0230373 A1 | 10/2007 | Li et al. | |
| 2007/0248068 A1 | 10/2007 | Onggosanusi et al. | |
| 2007/0253386 A1 | 11/2007 | Li et al. | |
| 2007/0270170 A1 | 11/2007 | Yoon et al. | |
| 2008/0013610 A1 | 1/2008 | Varadarajan et al. | |
| 2008/0025336 A1 | 1/2008 | Cho et al. | |
| 2008/0039067 A1 | 2/2008 | Jin et al. | |
| 2008/0043702 A1 | 2/2008 | Moon et al. | |
| 2008/0080364 A1 | 4/2008 | Barak et al. | |
| 2008/0080632 A1 | 4/2008 | Kim et al. | |
| 2008/0080634 A1 | 4/2008 | Kotecha et al. | |
| 2008/0080635 A1 | 4/2008 | Hugl et al. | |
| 2008/0080637 A1 | 4/2008 | Khan et al. | |
| 2008/0095258 A1 | 4/2008 | She et al. | |
| 2008/0101407 A1 | 5/2008 | Khan et al. | |
| 2008/0108310 A1 | 5/2008 | Tong et al. | |
| 2008/0112351 A1 | 5/2008 | Surineni et al. | |
| 2008/0130778 A1 | 6/2008 | Xia et al. | |
| 2008/0144522 A1 | 6/2008 | Chang et al. | |
| 2008/0165875 A1 | 7/2008 | Mundarath et al. | |
| 2008/0192852 A1 | 8/2008 | Kent et al. | |
| 2008/0198776 A1 | 8/2008 | Seo | |
| 2008/0232494 A1 | 9/2008 | Pan et al. | |
| 2008/0232503 A1 | 9/2008 | Kim | |
| 2008/0247364 A1 | 10/2008 | Kim et al. | |
| 2008/0247475 A1 | 10/2008 | Kim et al. | |
| 2008/0268855 A1 | 10/2008 | Hanuni et al. | |
| 2008/0268887 A1 | 10/2008 | Jansen et al. | |
| 2008/0285433 A1 | 11/2008 | Akita et al. | |
| 2008/0292013 A1 | 11/2008 | Varadarajan et al. | |
| 2008/0298452 A1 | 12/2008 | Sampath et al. | |
| 2008/0298482 A1 | 12/2008 | Rensburg et al. | |
| 2008/0318606 A1 | 12/2008 | Tsutsui et al. | |
| 2009/0011761 A1 | 1/2009 | Han et al. | |
| 2009/0016263 A1 | 1/2009 | Kishigami et al. | |
| 2009/0046569 A1* | 2/2009 | Chen et al. | 370/203 |
| 2009/0046800 A1 | 2/2009 | Xu et al. | |
| 2009/0098876 A1 | 4/2009 | Khan et al. | |
| 2009/0110114 A1 | 4/2009 | Onggosanusi et al. | |
| 2009/0122857 A1 | 5/2009 | Li et al. | |
| 2009/0161605 A1 | 6/2009 | Shen et al. | |
| 2009/0180561 A1 | 7/2009 | Kim et al. | |
| 2009/0252332 A1 | 10/2009 | Chang et al. | |
| 2009/0252333 A1 | 10/2009 | Chang et al. | |
| 2009/0282310 A1 | 11/2009 | Seok et al. | |
| 2009/0296844 A1 | 12/2009 | Ihm et al. | |
| 2009/0304109 A1 | 12/2009 | Kotecha | |
| 2010/0031117 A1 | 2/2010 | Lee et al. | |
| 2010/0034308 A1 | 2/2010 | Kim et al. | |
| 2010/0035627 A1 | 2/2010 | Hou et al. | |
| 2010/0054354 A1 | 3/2010 | Tosato | |
| 2010/0056170 A1 | 3/2010 | Lindoff et al. | |
| 2010/0061477 A1 | 3/2010 | Lee et al. | |
| 2010/0067512 A1 | 3/2010 | Nam et al. | |
| 2010/0069106 A1 | 3/2010 | Swarts et al. | |
| 2010/0074301 A1 | 3/2010 | Howard et al. | |
| 2010/0103834 A1 | 4/2010 | Gorokhov et al. | |
| 2010/0158151 A1 | 6/2010 | Krauss et al. | |
| 2010/0172424 A1 | 7/2010 | Perets et al. | |
| 2010/0172430 A1 | 7/2010 | Melzer et al. | |
| 2010/0173639 A1 | 7/2010 | Li et al. | |
| 2010/0215112 A1 | 8/2010 | Tsai et al. | |
| 2010/0220800 A1 | 9/2010 | Erell et al. | |
| 2010/0238984 A1 | 9/2010 | Sayana et al. | |
| 2010/0254474 A1 | 10/2010 | Gomadam et al. | |
| 2010/0260234 A1 | 10/2010 | Thomas et al. | |
| 2010/0260243 A1 | 10/2010 | Ihm et al. | |
| 2010/0267341 A1 | 10/2010 | Bergel et al. | |
| 2010/0271968 A1 | 10/2010 | Liu et al. | |
| 2010/0272014 A1 | 10/2010 | Orlik et al. | |
| 2010/0273514 A1 | 10/2010 | Koo et al. | |
| 2010/0278278 A1 | 11/2010 | Lee et al. | |
| 2010/0284484 A1 | 11/2010 | Jongren et al. | |
| 2010/0290548 A1 | 11/2010 | Hoshino et al. | |
| 2010/0296603 A1 | 11/2010 | Lee et al. | |
| 2011/0019631 A1 | 1/2011 | Kotecha et al. | |
| 2011/0026413 A1 | 2/2011 | Swarts et al. | |
| 2011/0034175 A1 | 2/2011 | Fong et al. | |
| 2011/0058621 A1 | 3/2011 | Clerckx et al. | |
| 2011/0064156 A1 | 3/2011 | Kim et al. | |
| 2011/0077038 A1 | 3/2011 | Montojo et al. | |
| 2011/0080969 A1 | 4/2011 | Jongren et al. | |
| 2011/0085610 A1 | 4/2011 | Zhuang et al. | |
| 2011/0103534 A1 | 5/2011 | Axmon et al. | |
| 2011/0110403 A1 | 5/2011 | Jongren | |
| 2011/0164701 A1 | 7/2011 | Nikopourdeilami et al. | |
| 2011/0170435 A1 | 7/2011 | Kim et al. | |
| 2011/0188393 A1 | 8/2011 | Mallik et al. | |
| 2011/0194594 A1 | 8/2011 | Noh et al. | |
| 2011/0194644 A1 | 8/2011 | Liu et al. | |
| 2011/0205930 A1 | 8/2011 | Rahman et al. | |
| 2011/0235608 A1 | 9/2011 | Koo et al. | |
| 2011/0250919 A1 | 10/2011 | Barbieri et al. | |
| 2011/0268204 A1 | 11/2011 | Choi et al. | |
| 2011/0306341 A1 | 12/2011 | Klein et al. | |
| 2012/0002568 A1 | 1/2012 | Tiirola et al. | |
| 2012/0020433 A1 | 1/2012 | Bhattad et al. | |
| 2012/0033592 A1 | 2/2012 | Kim et al. | |
| 2012/0058735 A1 | 3/2012 | Vermani et al. | |
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0087425 A1 | 4/2012 | Gomadam et al. | |
| 2012/0087435 A1 | 4/2012 | Gomadam et al. | |
| 2012/0134434 A1 | 5/2012 | Chen et al. | |
| 2012/0219042 A1 | 8/2012 | Onggosanusi et al. | |
| 2012/0219083 A1 | 8/2012 | Tong et al. | |
| 2012/0257664 A1 | 10/2012 | Yue et al. | |
| 2012/0275376 A1 | 11/2012 | Sampath et al. | |
| 2012/0275386 A1 | 11/2012 | Frenne et al. | |
| 2012/0281620 A1 | 11/2012 | Sampath et al. | |
| 2013/0028068 A1 | 1/2013 | Park et al. | |
| 2013/0028344 A1 | 1/2013 | Chen et al. | |
| 2013/0039284 A1 | 2/2013 | Marinier et al. | |
| 2013/0051256 A1 | 2/2013 | Ong et al. | |
| 2013/0107916 A1 | 5/2013 | Liu et al. | |
| 2013/0176991 A1 | 7/2013 | YI | |
| 2013/0182786 A1 | 7/2013 | Frenne et al. | |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |

(56) References Cited

FOREIGN PATENT DOCUMENTS

| WO | 2008133582 A2 | 11/2008 |
|---|---|---|
| WO | 2010013950 A2 | 2/2010 |
| WO | 2011/147692 A1 | 12/2011 |

OTHER PUBLICATIONS

Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
U.S. Appl. No. 13/023,555, filed Feb. 9, 2011.
U.S. Appl. No. 13/052,075, filed Mar. 20, 2011.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT Docomo), "Text Proposal for RAN1 TR on LTE Advanced", 3GPP TSG RAN WG1 Meeting #53bis, Warsaw, Poland, Jun. 30-Jul. 4, 2008.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
U.S. Appl. No. 12/983,898, filed Jan. 4, 2011.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Ericsson, "Design and Evaluation of Precoder Codebooks for CSI Feedback", 3GPP TSG RAN WG1 61bis, Dresden, Germany, Jun. 28-Jul. 2, 2010.
Rapporteur, "Coordinated Multi-Point Operation for LTE", TSG RAN WG1 50, Istanbul, Turkey, Dec. 7-10, 2010.
Alcatel-Lucent et al., "Way Forward on CSI Feedback for Re1.10 DL MIMO", 3GPP TSG RAN WG1 62, Madrid, Spain, Aug. 23-27, 2010.
Alcatel-Lucent et al., "Way Forward on 8Tx Codebook for Re1.10 DL MIMO", 3GPP TSG RAN WG1 62, Madrid, Spain, Aug. 23-27, 2010.
U.S. Appl. No. 61/390,423 filed Oct. 6, 2010.
U.S. Appl. No. 61/432,980 filed Jan. 14, 2011.
U.S. Appl. No. 61/390,511 filed Oct. 6, 2010.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on Enhancement for REL.10 DL MIMO", 3GPP TSG RAN # 62 Meeting, Madrid, Spain, Aug. 23-27, 2010.
Alcatel-Lucent, "Further Analysis of Companion Feedback Performance and Feedback Signaling Overhead Reduction", 3GPP TSG RAN # 62 Meeting, Madrid, Spain, Aug. 23-27, 2010.
Alcatel-Lucent et al., "Way Forward on CQI/PMI Reporting Enhancement on PUSCH 3-1 for 2,4 and 8TX", 3GPP TSG RAN # 62BIS, Xian, China, Oct. 11-5, 2010.
Marvell, "CQI Enhancement for 4Tx", 3GPP TSG RAN # 62BIS, Xian,China, Oct. 11-15, 2010.
NEC Group, "Enhancing MU-MIMO CQI", 3GPP TSG RAN # 62BIS, Xian, China, Oct. 11-15, 2010.
LG Electronics, "Further Discussion on CQI/PMI Enhancement", 3GPP TSG RAN # 62BIS, Xian, China, Oct. 11-15, 2010.
Samsung, "Coordinated Multi-Point Operation for LTE", Istanbul, Turkey, Dec. 7-10, 2010.
Alcatel-Lucent et al., "Way Forward on CSI Feedback for Re1.10 DL MIMO", 3GPP TSG RAN # 62 Meeting, Madrid, Spain, Aug. 23-27, 2010.
Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 13/346,737 filed Jan. 10, 2012.
U.S. Appl. No. 13/433,293 filed Mar. 29, 2012.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.

(56) References Cited

OTHER PUBLICATIONS

Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.8.0 (Dec. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 61/303,217 "Tree-Structure for Codebook Adaptation", filed Feb. 10, 2010.
U.S. Appl. No. 61/318,500 "Scoring Hypotheses in LTE Cell Search" filed Mar. 29, 2010.
U.S. Appl. No. 61/321,386 "Extending Rel 8 Feedback by Successive Codebook Refinement" filed Apr. 6, 2010.
U.S. Appl. No. 61/329,798 "Tree-Structure for Codebook Adaptation", filed Apr. 30, 2010.
U.S. Appl. No. 61/294,737 "Precoding Codebooks for 8TX XPOL Antennas" filed Mar. 13, 2010.
U.S. Appl. No. 12/965,878 "MIMO Feedback Schemes for Cross-Polarized Antennas" filed Dec. 12, 2010.
U.S. Appl. No. 12/903,237 "Transmission-Mode-Aware Rate Matching in MIMO Signal Generation" filed Oct. 13, 2010.
U.S. Appl. No. 12/838,509 "Asymmetrical Feedback for Coordinated Transmission Systems" filed Jul. 19, 2010.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Marvell, "Codebook Adaptation for ULA Antenna", 3GPP TSG RAN WG1 Meeting #60, San Francisco, USA, Feb. 22-22, 2010.
Marvell, "Successive Codebook Refinement: Further details and evaluation", 3GPP TSG-RAN WG1 #60bis, Beijing, Apr. 12-16, 2010.
Marvell Semiconductor, "Feedback Methods for exploiting Channel Correlation in LTE-A DL", Feedback Methods for exploiting Channel Correlation in LTE-A DL, Los Angeles, United States, Jun. 29-Jul. 3, 2009.
Marvell Semiconductor, "Spatial Correlation based transmission schemes for LTE-A DL", 3GPP TSG RAN WG1 meeting #58, Shenzhen, China, Aug. 24-28, 2009.
Samsung, Comparisons and performance evaluation of differential feedback proposals for Rel 8 PMI enhancements , 3GPP TSG RAN WG1 Meeting #59bis, Valencia, Spain, Jan. 18-22, 2010.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4x2 and 4x4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, "Best Companion" reporting for improved single-cell MU-MIMO pairing , 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting # 50, Athens, Greece, Feb. 9-13, 2009 (R4-091011).

(56) References Cited

OTHER PUBLICATIONS

Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8x8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
3rd Generation Partnership Project; "Technical Specification Group Radio Access Network; Evolved Universal Terrestrial Radio Access (E-UTRA)"; Physical Layer Procedures (Release 8), 3GPP TS 36.213 V8.6.0 (Mar. 2009), Sophia Antipolis, France.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.

Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
Bergel et al., U.S. Appl. No. 61/111,475 "Channel Feedback Schemes for Lte Advanced" filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSE RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, Notion of Anchor Carrier in LTE-A, 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
International Application PCT/IB2013/052963 Search Report dated Sep. 27, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
U.S. Appl. No. 12/965,878 Office Action dated Oct. 24, 2013.
U.S. Appl. No. 13/052,075 Notice of Allowance dated Nov. 8, 2013.
JP Patent Application # 2011-551560 Office Action dated Oct. 29, 2013.
JP Patent Application # 2012-506601 Office Action dated Oct. 22, 2013.

* cited by examiner

EFFICIENT ESTIMATION OF FEEDBACK FOR MODULATION AND CODING SCHEME (MCS) SELECTION

CROSS-REFERENCE TO RELATED APPLICATIONS

This application claims the benefit of U.S. Provisional Patent Application 61/251,213, filed Oct. 13, 2009, and U.S. Provisional Patent Application 61/371,098, filed Aug. 5, 2010, whose disclosures are incorporated herein by reference in their entirety.

FIELD OF THE DISCLOSURE

The present disclosure relates generally to communication systems, and particularly to efficient computation of Channel State Information (CSI).

BACKGROUND

In many communication systems, a receiver receives signals from a transmitter over a communication channel, estimates Channel State Information (CSI) of the channel, and sends to the transmitter feedback that is indicative of the estimated CSI. The transmitter adapts the signals transmitted to the receiver based on the CSI feedback.

CSI feedback is used, for example, in Evolved Universal Terrestrial Radio Access (E-UTRA) systems, also referred to as Long Term Evolution (LTE) systems. The Third Generation Partnership Project (3GPP) E-UTRA standards specify CSI feedback for use by E-UTRA User Equipment (UE) and base stations (eNodeB). These schemes are described, for example, in 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.6.0, March, 2009, which is incorporated herein by reference.

The description above is presented as a general overview of related art in this field and should not be construed as an admission that any of the information it contains constitutes prior art against the present patent application.

SUMMARY

An embodiment that is described herein provides a method including receiving reference signals in a mobile communication terminal. The mobile communication terminal is designed to receive data-carrying signals that are transmitted from a base station using one of multiple predefined Modulation and Coding Schemes (MCSs). One or more pre-calculated mappings between Signal-to-Noise Ratio (SNR) and error rate for one or more of the MCSs are held in the communication terminal. The pre-calculated mappings are adjusted according to one or more transmission parameters of the data-carrying signals. Measures indicative of respective actual spectral efficiencies that are achievable by the MCSs are estimated based on the adjusted mappings using the received reference signals. A preferred MCS is selected based on the estimated measures, and feedback that is indicative of the preferred MCS is sent to the base station.

In some embodiments, selecting the preferred MCS includes choosing the MCS having a highest spectral efficiency while satisfying a constraint on an error rate of the data-carrying signals. In an embodiment, the method includes holding respective pre-calculated Signal-to-Noise Ratio (SNR) thresholds above which the MCSs satisfy the constraint, and selecting the preferred MCS includes estimating respective effective SNRs for the one or more of the MCSs and comparing the effective SNRs to the respective SNR thresholds.

In some embodiments, estimating the measures includes estimating respective effective Signal-to-Noise Ratios (SNRs) for the MCSs, and estimating the measures of the actual spectral efficiencies based on the effective SNRs. In an embodiment, estimating the measures includes applying an Exponential Effective Signal to Interference and Noise Ratio Mapping (EESM) to estimate the effective SNRs. In another embodiment, estimating the effective SNRs includes calculating input SNRs by processing the received reference signals, limiting amplitudes of the input SNRs, and calculating the effective SNRs based on the input SNRs having the limited amplitudes. In yet another embodiment, estimating the measures includes averaging the effective SNRs, and calculating the measures based on the averaged effective SNRs. In still another embodiment, estimating the effective SNRs includes calculating input SNRs by processing the received reference signals, calculating the effective SNRs based on the input SNRs, and scaling the effective SNRs based on a ratio between a maximum and a minimum of the input SNRs. In a disclosed embodiment, the method includes computing a preferred number of spatial streams and time-averaging the preferred number of the spatial streams, and sending the feedback further includes indicating the time-averaged preferred number of the spatial streams to the base station.

There is additionally provided, in accordance with an embodiment that is described herein, apparatus including a receiver, a processor and a transmitter. The receiver is configured to receive reference signals from a base station, and to receive from the base station data-carrying signals that are transmitted using one of multiple predefined Modulation and Coding Schemes (MCSs). The processor is configured to hold one or more pre-calculated mappings between Signal-to-Noise Ratio (SNR) and error rate for one or more of the MCSs, to adjust the pre-calculated mappings according to one or more transmission parameters of the data-carrying signals, to estimate, based on the adjusted mappings and using the received reference signals, respective measures indicative of actual spectral efficiencies that are achievable by the MCSs, and to select a preferred MCS based on the estimated measures. The transmitter is configured to send to the base station feedback that is indicative of the preferred MCS.

Another embodiment that is described herein provides a method including receiving reference signals in a mobile communication terminal. The mobile communication terminal is designed to receive data-carrying signals that are transmitted from a base station using one of multiple predefined Modulation and Coding Schemes (MCSs), having respective maximum spectral efficiencies defining a first order of the MCSs from most efficient to least efficient. Based on the received reference signals, respective measures indicative of actual spectral efficiencies that are achievable by one or more of the MCSs are estimated, by evaluating the one or more of the MCSs in a second order that is different from the first order. A preferred MCS is selected based on the estimated measures. Feedback that is indicative of the preferred MCS is sent to the base station.

In some embodiments, selecting the preferred MCS includes choosing the MCS having a highest spectral efficiency while satisfying a constraint on an error rate of the data-carrying signals. In an embodiment, evaluating the one or more of the MCSs includes estimating a given spectral efficiency for a given MCS, discarding the MCSs whose actual spectral efficiencies are higher than the given spectral efficiency when the given MCS does not satisfy the constraint; and discarding the MCSs whose actual spectral efficiencies are lower than the given spectral efficiency when the given MCS satisfies the constraint. In a disclosed embodiment, the method includes holding respective pre-calculated Signal-to-Noise Ratio (SNR) thresholds above which the MCSs satisfy the constraint, and selecting the preferred MCS includes estimating respective effective SNRs for the one or more of the MCSs and comparing the effective SNRs to the respective SNR thresholds.

In another embodiment, evaluating the one or more of the MCSs includes estimating an effective Signal-to-Noise Ratio (SNR) for a given MCS, selecting a partial subset of the MCSs based on the estimated effective SNR, and evaluating only the MCSs in the partial subset. In yet another embodiment, estimating the measures includes holding a pre-calculated mapping between Signal-to-Noise Ratio (SNR) and error rate for at least a given MCS, adjusting the pre-calculated mapping according to one or more transmission parameters of the data-carrying signals, and estimating an actual spectral efficiency for the given MCS based on the adjusted mapping.

In some embodiments, evaluating the MCSs includes estimating respective effective Signal-to-Noise Ratios (SNRs) for the evaluated MCSs, and estimating the measures of the actual spectral efficiencies based on the effective SNRs. In an embodiment, estimating the measures of the actual spectral efficiencies includes applying an Exponential Effective Signal to Interference and Noise Ratio Mapping (EESM) to estimate the effective SNRs. In another embodiment, estimating the effective SNRs includes calculating input SNRs by processing the received reference signals, limiting amplitudes of the input SNRs, and calculating the effective SNRs based on the input SNRs having the limited amplitudes.

In yet another embodiment, estimating the measures of the actual spectral efficiencies includes averaging the effective SNRs, and calculating the measures based on the averaged effective SNRs. In still another embodiment, estimating the effective SNRs includes calculating input SNRs by processing the received reference signals, calculating the effective SNRs based on the input SNRs, and scaling the effective SNRs based on a ratio between a maximum and a minimum of the input SNRs. In a disclosed embodiment, the method includes computing a preferred number of spatial streams and time-averaging the preferred number of the spatial streams, and sending the feedback further includes indicating the time-averaged preferred number of the spatial streams to the base station.

There is additionally provided, in accordance with an embodiment that is described herein, a method that includes receiving reference signals in a mobile communication terminal. The mobile communication terminal is designed to receive data carrying signals that are transmitted from a base station using one of multiple predefined Modulation and Coding Schemes (MCSs) and one of multiple predefined Multiple-Input Multiple-Output (MIMO) precoding schemes. A preferred MIMO precoding scheme is selected by processing the received reference signals. Measures indicative of respective spectral efficiencies that are achievable by one or more of the MCSs, when used in combination with the preferred MIMO precoding scheme, are evaluated. A preferred MCS is selected based on the evaluated measures. Feedback that is indicative of the preferred MIMO precoding scheme and the preferred MCS is sent to the base station.

In some embodiments, the method includes selecting a preferred number of spatial streams based on the received reference signals, evaluating the measures includes estimating the spectral efficiencies of the one or more of the MCSs when used in combination with the preferred number of the spatial streams, and sending the feedback includes indicating the preferred number of the spatial streams to the base station. In an embodiment, evaluating the measures includes selecting a preferred set of spectral sub-bands based on the preferred MIMO precoding scheme, and sending the feedback includes indicating the preferred set of sub-bands to the base station.

There is also provided, in accordance with an embodiment that is described herein, a method used in a mobile communication terminal that is designed to receive downlink signals that are transmitted from a base station in multiple spectral sub-bands. The method includes estimating respective measures indicative of band-specific spectral efficiencies for the multiple sub-bands. A preferred subset of the sub-bands, in which downlink transmission is expected to achieve a maximum spectral efficiency, is selected based on the estimated measures. Feedback that is indicative of the preferred subset of the sub-bands is sent to the base station.

In some embodiments, the method includes selecting a preferred transmission scheme for use in transmitting the downlink signals on the preferred subset of the sub-bands, and sending the feedback includes indicating the preferred transmission scheme to the base station.

There is further provided, in accordance with an embodiment that is described herein, apparatus including a receiver, a processor and a transmitter. The receiver is configured to receive reference signals from a base station, and to receive from the base station data-carrying signals that are transmitted using one of multiple predefined Modulation and Coding Schemes (MCSs) having respective maximum spectral efficiencies defining a first order of the MCSs from most efficient to least efficient. The processor is configured to estimate, based on the received reference signals, respective measures indicative of actual spectral efficiencies that are achievable by one or more of the MCSs, by evaluating the one or more of the MCSs in a second order that is different from the first order, and to select a preferred MCS based on the estimated measures. The transmitter is configured to send to the base station feedback that is indicative of the preferred MCS. In some embodiments, a mobile communication terminal includes the disclosed apparatus. In some embodiments, a chipset for processing signals in a mobile communication terminal includes the disclosed apparatus.

There is additionally provided, in accordance with an embodiment that is described herein, apparatus including a receiver, a processor and a transmitter. The receiver is configured to receive reference signals from a base station, and to receive from the base station data carrying signals that are transmitted using one of multiple predefined Modulation and Coding Schemes (MCSs) and one of multiple predefined Multiple-Input Multiple-Output (MIMO) precoding schemes. The processor is configured to select a preferred MIMO precoding scheme by processing the received reference signals, to evaluate respective measures indicative of spectral efficiencies that are achievable by one or more of the MCSs when used in combination with the preferred MIMO precoding scheme, and to select a preferred MCS based on the evaluated measures. The transmitter is configured to send to the base station feedback that is indicative of the preferred MIMO precoding scheme and the preferred MCS.

There is also provided, in accordance with an embodiment that is described herein, apparatus including a receiver, a processor and a transmitter. the receiver is configured to receive downlink signals that are transmitted from a base station in multiple spectral sub-bands. The processor is configured to estimate respective measures indicative of band-specific spectral efficiencies for the multiple sub-bands, and to select a preferred subset of the sub-bands, in which downlink transmission is expected to achieve a maximum spectral efficiency, based on the estimated measures. The transmitter is configured to send to the base station feedback that is indicative of the preferred subset of the sub-bands.

The present disclosure will be more fully understood from the following detailed description of the embodiments thereof, taken together with the drawings in which:

DETAILED DESCRIPTION OF EMBODIMENTS

In LTE systems, each User Equipment (UE) is required to provide the Base Station (BS) with Channel State Information (CSI). In accordance with the LTE specifications, the BS configures the UEs with the specific type(s) and timing of the CSI feedback they are requested to provide. The BS uses the CSI feedback for adapting the transmissions to the UEs, for example in making scheduling and link adaptation decisions. In the CSI feedback, the UE typically indicates certain preferred parameters within the BS transmission scheme, typically the parameters that the UE prefers the BS to use in subsequent transmissions to the UE. In the present context, the term "BS transmission scheme" refers to any parameter or parameters defining the BS transmission.

According to the TS 36.213 specification, cited above, the CSI feedback potentially includes parameters such as one or more preferred Channel Quality Indices (CQI—corresponding to preferred Modulation and Coding Schemes—MCS—of the BS), one or more preferred Precoding Matrix Indices (PMI), preferred transmission rank (a preferred number of spatial streams, referred to as Rank Index—RI), and/or indices of preferred spectral sub-bands (referred to as Band Index—BI). The format (and therefore the content) of the CSI feedback provided by a particular UE typically depends on the transmission mode of the BS (e.g., spatial multiplexing vs. transmit diversity) and on a reporting mode that is specified for the UE. A given UE is typically required to support multiple CSI feedback formats within a certain operation time interval, and should therefore be designed to respond to a wide range of CSI feedback requests from the BS.

As can be understood from the description above, the total number of possible combinations of feedback parameters is very high. It is possible in principle to select the preferred BS transmission scheme parameters by evaluating the different parameter combinations exhaustively. Performing such an exhaustive process with high accuracy, however, is often beyond the computational capabilities of the UE. Exhaustive evaluation at a reduced accuracy, on the other hand, would degrade the feedback quality.

Embodiments that are described herein provide improved methods and devices for calculating CSI feedback in mobile communication terminals. The disclosed techniques reduce the number of feedback parameter combinations that are evaluated by the UE, with little or no degradation in feedback accuracy. By using the methods and devices described herein, mobile communication terminals can calculate CSI feedback with high accuracy using modest computational power. Several ancillary techniques for increasing the accuracy of the CSI feedback calculations are also described herein.

Figure 1:
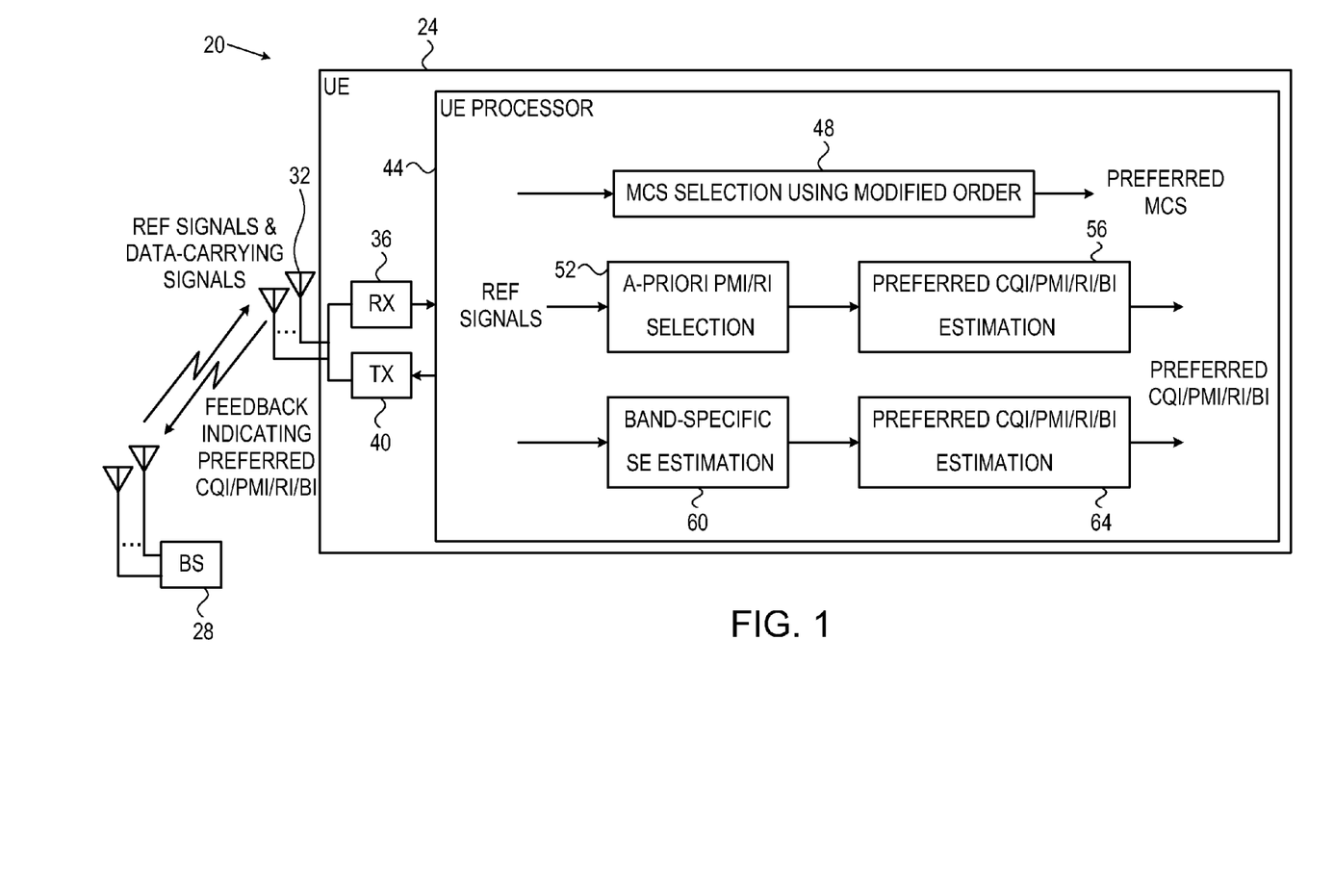
FIG. 1 is a block diagram that schematically illustrates a communication system, in accordance with an embodiment that is described herein.

FIG. 1 is a block diagram that schematically illustrates a communication system 20 that uses CSI feedback, in accordance with an embodiment that is described herein. In the present example, system 20 comprises an E-UTRA (LTE) system that operates in accordance with the TS 36.213 specification, cited above. In alternative embodiments, however, system 20 may operate in accordance with any other suitable communication standard or specification that employs CSI feedback, such as, for example, UMTS Terrestrial Radio Access (UTRA) systems (also sometimes referred to as Wideband Code Division Multiple Access—WCDMA) and WiMAX systems operating in accordance with IEEE 802.16 specifications.

System 20 comprises a mobile communication terminal, in the present example an LTE UE 24. UE 24 communicates with a BS 28. In particular, the UE receives from the BS downlink signals, which comprise reference signals and optionally data-carrying signals. The data-carrying signals convey user data, signaling and other information from the BS to the UE. The reference signals comprise pilot signals that do not carry data or signaling, and are used for synchronization, channel estimation and other measurements.

In an embodiment, at a given instant, the BS transmits a given data-carrying signal to a given UE using a certain transmission scheme. In an embodiment, the BS modulates and encodes the data using a certain Modulation and Coding Scheme (MCS) that the BS selects from a predefined set of MCSs. Each MCS in the set is characterized by a certain throughput and a certain Spectral Efficiency (SE). The supported range of SE values typically corresponds to a range of respective Channel Quality Indices (CQIs), so that each one of the CQI values in a predefined CQI set corresponds roughly to a certain MCS in the predefined MCS set. (For that reason, the terms "CQI" and "preferred MCS" are occasionally used interchangeably below. Each MCS is therefore referred to as corresponding to a certain SE.)

In some embodiments, the BS comprises multiple antennas and the downlink signals comprise Multiple-Input Multiple-Output (MIMO) signals. In these embodiments, the BS typically precodes the downlink signals using a certain precoding scheme that is represented by a precoding matrix. The matrix is typically selected from a predefined set of matrices, referred to as a codebook, and each matrix in the codebook is identified by a respective Precoding Matrix Index (PMI).

In some embodiments, the BS maps the downlink signals onto a certain number of spatial streams (also referred to as spatial layers) that are transmitted in parallel. The number of spatial layers is referred to as a transmission rank or Rank Index (RI). In some embodiments, the frequency range allocated to the BS is sub-divided into multiple spectral sub-bands, and the BS transmits a given data-carrying signal on a certain subset of one or more spectral sub-bands. The sub-bands are identified using Band Indices (BI).

Thus, the transmission scheme of the BS is typically specified by a certain set of MCS (CQI), PMI, RI and BI values, or a subset of one or more of these parameters. In addition, in an embodiment the BS transmits in one of multiple transmission modes, e.g., a spatial multiplexing mode or a transmit diversity mode.

In some embodiments, UE 24 is configured by BS 28 to calculate and provide CSI feedback. The CSI feedback is indicative of the characteristics of the communication channel between the BS and the UE, and/or of the BS transmission scheme that is preferred by the UE for receiving data-carrying signals from the BS over this channel. In some embodiments, the CSI feedback comprises a preferred MCS, preferred PMI, preferred RI, preferred BI, or any subset comprising one or more of these parameters. In some embodiments, the UE selects the BS transmission scheme (e.g., MCS, PMI, RI and/or BI) that provides maximum throughput of the data-carrying signals (maximum spectral efficiency), while satisfying a constraint set on the error probability of the data-carrying signals. In an example embodiment, the UE selects the BS transmission scheme that maximizes downlink throughput while maintaining a Block Error Rate (BLER) of no more than 10%. In alternative embodiments, other error rate constraints can be used.

In some embodiments, the BS configures the UE with a certain reporting format, which specifies the requested format (and therefore the content) of the CSI feedback. The CSI feedback format may also depend on the transmission mode of the BS (e.g., spatial multiplexing or transmit diversity).

In the example embodiment of FIG. 1, UE 24 comprises a set of antennas 32, a receiver (RX) 36, a transmitter (TX) 40 and a UE processor 44. Receiver 36 receives the downlink signals from BS 28, including the reference signals and the data-carrying signals, via antennas 32. Processor 44 calculates the CSI feedback using methods that are described in detail below. Transmitter 40 transmits the CSI feedback to BS 28. The BS uses the CSI feedback in producing the downlink signals, e.g., in making scheduling and link adaptation decisions.

In some embodiments, UE processor 44 calculates the CSI feedback by processing the reference signals, since the received reference signals are indicative of the characteristics of the communication channel (e.g., channel response and noise). In an embodiment, the CSI feedback calculation does not consider the data-carrying signals, and does not depend on the quality at which the data-carrying signals are received, if at all.

In some embodiments, processor 44 comprises an MCS selection unit 48, which selects a preferred MCS by evaluating one or more of the predefined MCSs. Unit 48 typically attempts to find the MCS having the highest spectral efficiency (highest throughput) that still satisfies the error rate constraint (e.g., BLER≤10%). In an embodiment, unit 48 evaluates the MCSs in an order that is not monotonic in terms of spectral efficiency. In other words, the order in which unit 48 evaluates the MCSs does not scan the MCSs from most spectrally-efficient to least spectrally-efficient or vice versa. Several examples of non-monotonic scanning processes are described with reference to FIGS. 4-6 below. These processes reduce the average number of MCSs that need to be evaluated before finding the preferred MCS. As a result, the time and computational complexity of CSI feedback calculation are reduced. Alternatively to the processes of FIGS. 4-6, UE processor 44 may evaluate the MCSs in any other suitable non-monotonic spectral efficiency order.

When considering a particular MCS during the MCS scanning processes described herein, the UE processor typically evaluates a respective measure that is indicative of the spectral efficiency of that MCS. In the description that follows, the evaluated measure of a given MCS comprises the spectral efficiency of that MCS. Alternatively, however, the measure may comprise any other suitable metric that is indicative of the spectral efficiency. Based on the evaluated measures, the UE processor selects a preferable MCS and indicates the preferred MCS to the BS.

In some embodiments, processor 44 initially selects one or more preferred PMIs, and optionally also one or more preferred RIs. Then, the processor calculates the other CSI feedback parameters given the previously-selected PMIs (and optionally RIs). By a-priori focusing on one or more specific PMIs/RIs, the number of evaluated combinations of feedback parameters is reduced considerably, with little degradation in feedback accuracy. For example, when the Signal-to-Noise Ratio (SNR) is low, the preferred rank is very likely to be RI=1 regardless of other transmission scheme parameters. In an example embodiment, processor 44 initially selects RI=1 when the SNR is below a certain SNR threshold. This a-priori selection enables processor to reach the optimal CSI feedback without unnecessarily evaluating parameter combinations for which RI≠1.

In these embodiments, UE processor 44 comprises a PMI/RI selection unit 52, which selects the preferred PMI/RI, and a parameter estimation unit 56, which selects the other CSI feedback parameters (e.g., CQI and BI, and optionally RI). A technique that initially selects PMI/RI is shown in greater detail in FIG. 7 below.

Another possible way to reduce the number of feedback parameter combinations is to initially select a set of spectral sub-bands (BI). In some embodiments, processor 44 initially selects a preferred BI. Then, the processor calculates the other CSI feedback parameters given the previously-selected BI. This technique reduces the number of feedback parameter combinations that are evaluated by processor 44, with little degradation in feedback accuracy. In some embodiments, processor 44 comprises a band-specific Spectral Efficiency (SE) estimation unit 60, which estimates a respective SE for each spectral sub-band. A parameter estimation unit 64 selects the CSI feedback parameters (e.g., CQI, PMI, RI and/or BI) using the band-specific SE values.

In an embodiment, unit 64 first selects the preferred subset of spectral sub-bands (BI) based on the band-specific SE values, and then selects the other feedback parameters given the previously-selected subset of spectral sub-bands. A technique of this sort is shown in greater detail in FIG. 8 below.

The three techniques outlined above (MCS evaluation in non-monotonic order of spectral efficiency, a-priori selection of preferred PMI, and a-priori estimation of band-specific spectral efficiency) are described purely by way of example. In alternative embodiments, UE processor 44 may use various other techniques for reducing the number of evaluated combinations of feedback parameters. For example, the UE processor may apply any single one of the above-described techniques, or any combination of two or more techniques, or all three techniques.

Figure 2:
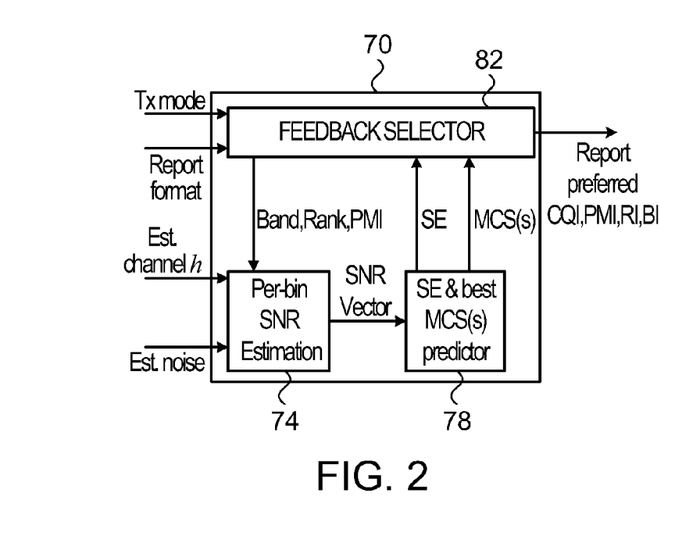
FIG. 2 is a block diagram that schematically illustrates a CSI feedback estimation unit, in accordance with an embodiment that is described herein.

FIG. 2 is a block diagram that schematically illustrates a CSI feedback estimation unit 70, in accordance with an embodiment that is described herein. Unit 70 can be implemented as part of UE processor 44 of FIG. 1 above. In the present example, unit 70 comprises a Signal-to-Noise Ratio (SNR) estimation unit 74, which estimates SNR as a function of time and frequency. In an embodiment, unit 74 estimates the SNR for each time-frequency bin that is used for transmitting the downlink signals. Unit 74 receives an estimate of the MIMO communication channel response (denoted h) and an estimate of the noise covariance at the receiver. Both estimates are calculated by processor 44 based on the received reference signals. Based on the channel response and noise estimates, unit 74 calculates an SNR vector that estimates the SNR for the different time-frequency bins (possibly per spatial stream, when multi-stream transmission is applicable).

The SNR vector is provided as input to a SE & MCS predictor unit 78. Unit 78 estimates the Spectral Efficiency (SE) for each MCS. A feedback selection unit 82 calculates the preferred CSI feedback based on the estimated spectral efficiencies provided by unit 78. In an embodiment, unit 82 selects the MCS having the highest SE while meeting a predefined error rate constraint (e.g., a Block Error Rate—BLER—of 10% or better). In some embodiments, unit 82 also calculates the preferable PMI, RI and/or BI. The identity of the CSI feedback parameters and/or the selection criteria may also depend on the transmission mode of the BS (e.g., spatial multiplexing vs. transmit diversity) and/or the reporting mode that is specified for the UE. Unit 82 outputs the preferred CQI (MCS), PMI, RI and/or BI, and UE processor 44 provides this CSI feedback to transmitter (FIG. 1) for transmission to BS 28.

In an embodiment, unit 78 estimates the SE of a given MCS, and the associated BLER, using any suitable method. In an example embodiment, unit 78 estimates the SE using Exponential Effective SNR Mapping (EESM), where SNR stands for Signal to (Interference and) Noise Ratio. EESM is described, for example, in "System-Level Evaluation of OFDM—Further Considerations," Document R1-031303, TSG-RAN WG1 #35 meeting, Lisbon, Portugal, Nov. 17-21, 2003, which is incorporated herein by reference in its entirety. In another example embodiment, unit 78 uses methods that are based on Mutual Information (MU). MU methods are described, for example, in "Link Error Prediction for E-DCH," Document R1-031276, 3GPP TSG-RAN WG1 meeting, Lisbon, Portugal, Nov. 17-21, 2003, which is incorporated herein by reference in its entirety.

Figure 3:
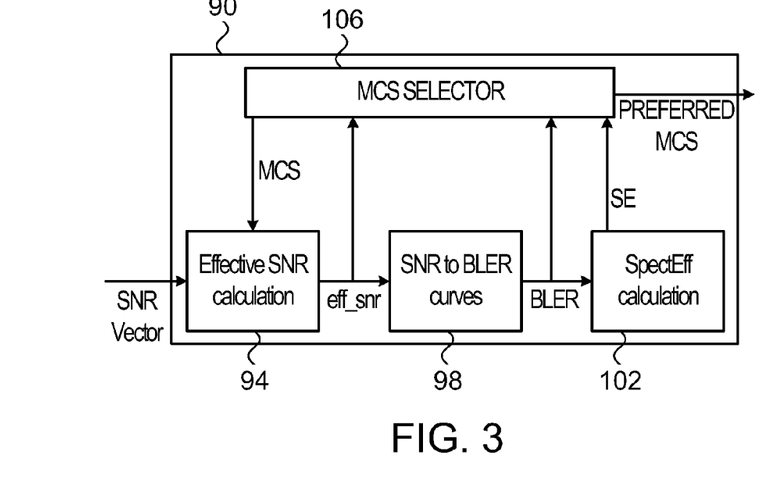
FIG. 3 is a block diagram that schematically illustrates a Modulation and Coding Scheme (MCS) selection unit, in accordance with an embodiment that is described herein.

FIG. 3 is a block diagram that schematically illustrates a Modulation and Coding Scheme (MCS) selection unit 90, in accordance with an embodiment that is described herein. Unit 90 carries out the functionality of unit 78, as well as some of the functionality of unit 82 of FIG. 2. Unit 90 accepts as input an SNR vector, such as the vector produced by unit 74 of FIG. 2. Unit 90 comprises an effective SNR calculation unit 94, which calculates a respective effective SNR for each MCS. An SNR-to-BLER translation unit 98 translates the effective SNRs to respective predicted BLER values. Unit 98 typically holds a mapping (e.g., translation tables or functions) that translates effective SNR into BLER for various MCSs. Unit 98 thus produces a respective BLER value for each evaluated MCS. A SE calculation unit 102 estimates the SE of each evaluated MCS. An MCS selection unit 106 selects the preferred MCS based on the outputs of units 94, 98 and 102.

In an example embodiment, effective SNR calculation unit 94 calculates the effective SNR of each MCS by evaluating:

$$\text{eff\_snr}(MCS) = -\beta(MCS) \cdot \log\left[\frac{1}{N} \cdot \sum_{k=1}^{N} e^{-snr(k)/\beta(MCS)}\right] \quad \text{Equation 1}$$

wherein snr denotes the SNR vector, N denotes the size of the SNR vector, β denotes an averaging coefficient that depends on the MCS, and MCS denotes the index of the MCS in question. The N elements of vector snr comprise SNR values (on a linear scale, as opposed to a logarithmic scale such as measured in decibels [dB]), which respectively correspond to the time-frequency bins over which the downlink signals are transmitted. The SNR values, as explained above, are computed based on the channel response and noise estimates. For LTE release 8 systems, for example, the MCS (or CQI) index accepts values between one and fifteen.

The calculation of Equation [1] is based on EESM, as applied to the LTE Orthogonal Frequency Division Multiplexing (OFDM) signal. Such a calculation is described, for example, in "OFDM Exponential Effective SIR Mapping Validation, EESM Simulation Results for System-Level Performance Evaluations, and Text Proposal for Section A.4.5 of TR 25.892," Document R1-04-0089, 3GPP TSG-RAN-1/TSG-RAN-4 meeting, Espoo, Finland, Jan. 27-30, 2004, which is incorporated herein by reference. In alternative embodiments, unit 94 may calculate the effective SNRs using SNR averaging methods, such as methods based on Mutual Information (MU).

In an embodiment, unit 94 typically applies soft limiting pre-processing to the elements of the SNR vector, which imposes an upper bound on each SNR element using some smooth monotonically-increasing (parametric) function $f_{lim}$(snr(k)) before applying Equation [1] to the vector. The soft limiting function maps elements snr(k) to respective soft-limited values denoted snr'(k).

Additionally or alternatively, unit 94 uses min-max methods that reduce the sensitivity of the output effective SNR to large variance in the SNR values in the vector snr. Based on the resulting value obtained for the left-hand-side of Equation [1], as well as on the value of the ratio $\max_k(\text{snr}(k))/\min_k(\text{snr}(k))$ and some configurable parameters, unit 94 computes a multiplicative scaling factor. Unit 94 then computes the effective SNR by multiplying the result obtained from Equation [1] by the multiplicative factor. In yet another embodiment, unit 94 applies averaging over time to the effective SNRs that are calculated using Equation [1]. This technique is useful, for example, in order to perform estimation in UEs that are in motion, especially at high velocity.

In an embodiment, SNR-to-BLER translation unit 98 estimates the BLER of a given MCS by evaluating:

$$\text{est\_bler}(MCS) = \text{snr\_to\_bler}(\text{eff\_snr}(MCS); MCS) \quad \text{Equation 2}$$

wherein snr_to_bler denotes the SNR-BLER mapping held in unit 94. In an embodiment, SE calculation unit 102 estimates the actual SE that is achievable by a given MCS at the estimated BLER by evaluating:

$$\text{est\_SE}(MCS) = [1 - \text{est\_bler}(MCS)] \cdot \text{MaxSE}(MCS) \quad \text{Equation 3}$$

wherein MaxSE denotes the maximum theoretical SE of the MCS. Alternatively, units 98 and 102 may apply any other suitable estimation or calculation. MCS selection unit 106 typically selects the MCS having the highest actual SE that satisfies the error rate constraint (e.g., est_bler≤10%):

$$\text{est\_mcs} = \frac{\text{ArgMax}(\text{est\_SE}(MCS))}{mcs; \text{est\_bler}(mcs) \leq 0.1} \quad \text{Equation 4}$$

The embodiments that are described below provide several example processes for calculating the CSI feedback, e.g., preferred MCS, PMI, RI and/or BI. These processes can be embodied, for example, in units 48, 56 and 64 of FIG. 1, in unit 82 of FIG. 2 and/or in unit 106 of FIG. 3.

Figure 4:
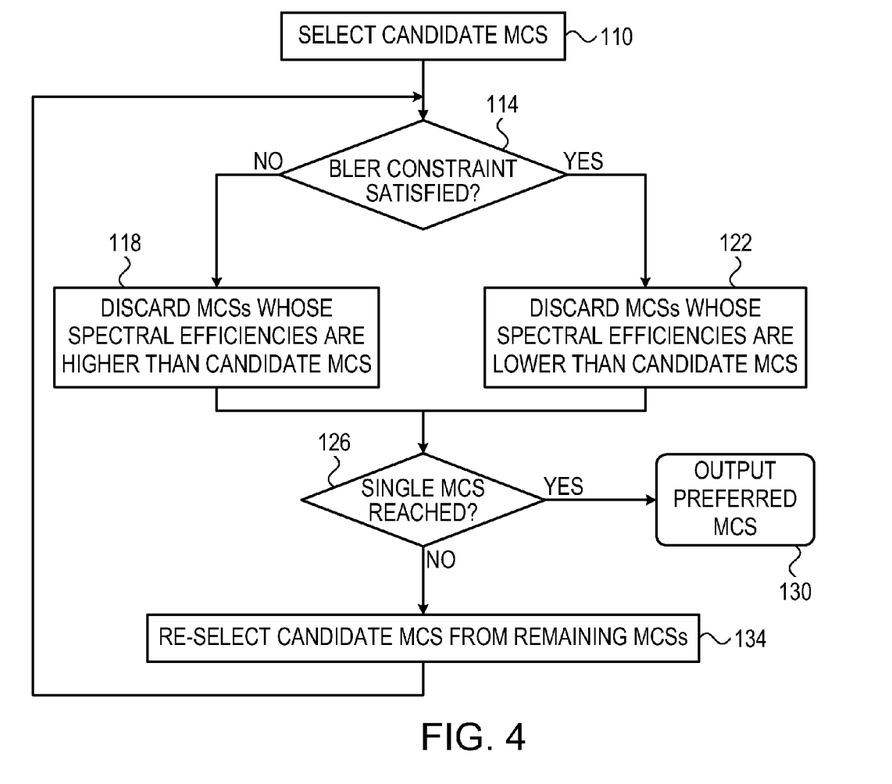
FIG. 4 is a flow chart that schematically illustrates a method for MCS selection, in accordance with an embodiment that is described herein.

FIG. 4 is a flow chart that schematically illustrates a method for MCS selection, in accordance with an embodiment that is described herein. The following description refers to the method as being carried out by unit 48 of UE processor 44 (FIG. 1). Alternatively, however, this method can be carried out, for example, by unit 82 of FIG. 2 or unit 106 of FIG. 3. The method of FIG. 4 evaluates a set of candidate MCSs in order to find the MCS that has the highest SE while meeting a predefined error rate constraint (e.g., BLER≤10%). In LTE release 8, for example, the set comprises fifteen MCSs denoted MCS1 . . . MCS15. Each MCS in the set has a respective maximum theoretical SE. (The maximum theoretical SE is typically defined as the SE for BLER=0.)

Instead of evaluating the MCSs sequentially from most-spectrally-efficient to least-spectrally-efficient or vice versa, the method of FIG. 4 applies a binary search order that reduces the number of evaluated MCSs considerably. The method begins at an initialization operation 110, with unit 48 selecting an initial candidate MCS. Typically, the initial candidate is selected in the middle of the set, e.g., MCS7 or MCS8. Alternatively, however, any MCS may serve as the initial candidate. Unit 48 checks whether the candidate MCS satisfies the constraint on the predicted error rate, at a constraint checking operation 114.

If the constraint is not satisfied by the candidate MCS, then unit 48 discards the MCSs whose maximum SEs are higher than that of the candidate MCS, at a high discarding operation 118. The rationale behind this discarding operation is that if the candidate MCS does not satisfy the error rate constraint, any MCS having a higher maximum SE will not satisfy the error rate constraint, as well. If, on the other hand, the constraint is satisfied by the candidate MCS, unit 48 discards the MCSs whose maximum SEs are lower than that of the candidate MCS, at a low discarding operation 122. The rationale behind this discarding operation is that if the candidate MCS satisfies the error rate constraint, the preferred MCS will have a maximum SE that is at least as high as that of the candidate MCS.

At this stage, unit 48 has discarded one or more of the MCSs based on whether the candidate MCS satisfies the error rate constraint. Unit 48 now checks whether the remaining MCSs comprise only a single MCS, at a termination checking operation 126. If a single MCS was reached, unit 48 outputs this MCS as the preferred MCS, at an output operation 130, and the method terminates. If, on the other hand, a single MCS was not yet reached, unit 48 selects another candidate MCS from the remaining MCSs (i.e., from the MCSs that were not discarded at operation 118 or 122), at a candidate re-selection operation 134. Typically although not necessarily, unit (FIG. 1) selects the new candidate MCS in the middle (in terms of maximum SE) of the remaining MCS subset. The method then loops back to operation 114 above, unless the remaining MCS subset is empty. An empty MCS subset serves as an indication that even MCS1 (the MCS having the lowest SE) does not satisfy the required constraint, and so the value CQI=0 should be fed back to the BS.

The binary search process of FIG. 4 can reduce the number of iterations to ⌈log₂(#MCS)⌉ instead of #MCS, wherein #MCS denotes the number of MCSs in the set. Each iteration typically involves calculating the effective SNR and estimated BLER of the candidate MCS, as explained above. In LTE release 8, for example, the reduction is from fifteen to four, i.e., by a factor of 3.75.

Figure 5:
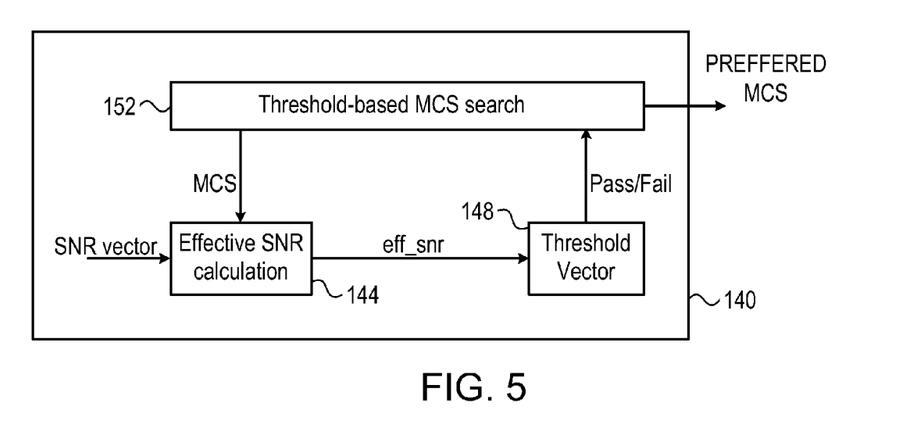
FIGS. 5 and 6 are block diagrams that schematically illustrate MCS selection units, in accordance with embodiments that are described herein.

FIG. 5 is a block diagram that schematically illustrates a MCS selection unit 140, in accordance with an alternative embodiment that is described herein. In this embodiment, unit 140 holds a set of pre-calculated SNR thresholds. Each SNR threshold corresponds to a respective MCS, and gives the SNR above which this MCS satisfies the error rate constraint (e.g., BLER≤10%). Instead of translating the effective SNRs of the different MCSs to BLERs (as in FIG. 3, for example), the scheme of FIG. 5 compares the effective SNRs directly to the SNR thresholds in order to find the preferred MCS. In comparison with unit 90 of FIG. 3 that holds an SNR-to-BLER mapping for each MCS, unit 140 of FIG. 5 holds only a single scalar value (SNR threshold) for each MCS. As a result, memory requirements and computational complexity are reduced.

In the present example, unit 140 comprises an effective SNR calculation unit 144, which is similar to unit 94 of FIG. 3. Unit 144 accepts an SNR vector and calculates an effective SNR for each evaluated MCS. A threshold vector unit 148 holds the SNR thresholds described above. Unit 148 compares each effective SNR that is calculated by unit 144 to the SNR threshold of the corresponding MCS, and outputs a pass/fail indication. (A pass indication means that the effective SNR of the currently-evaluated MCS is higher than or equal to the SNR threshold of that MCS, and a fail indication means that the effective SNR is lower than the SNR threshold.)

A threshold-based search unit 152 searches for the preferred MCS based on the output of unit 148. In an example embodiment, unit 152 performs a binary search process similar to the process of FIG. 4 above. In each iteration of the search process, however, unit 152 compares the effective SNR of the candidate MCS to the corresponding SNR threshold (instead of translating the effective SNR into BLER and checking the error rate constraint). Alternatively, unit 140 scans the MCSs in any other suitable (e.g., non-monotonic) search order.

Figure 6:
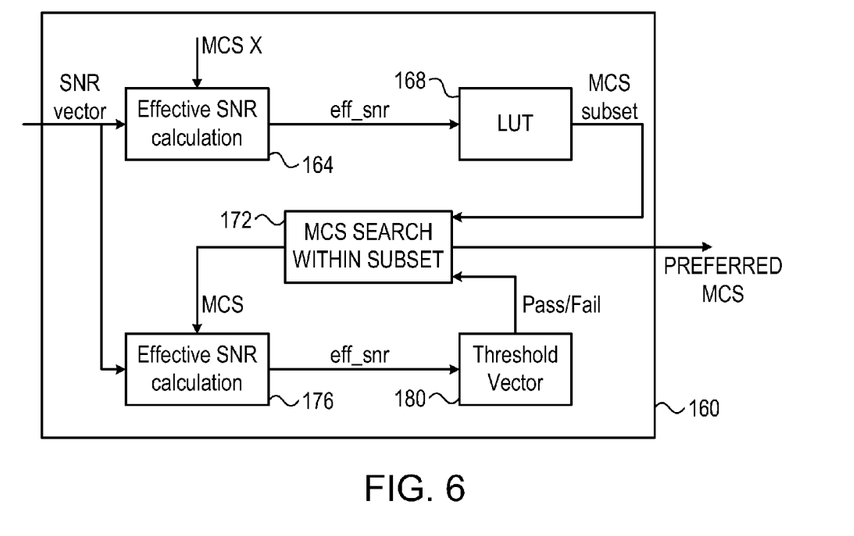

FIG. 6 is a block diagram that schematically illustrates a MCS selection unit 160, in accordance with yet another embodiment that is described herein. In some practical cases, evaluating the effective SNR for a certain MCS enables a narrowing of the subsequent search to a reduced subset of the MCSs. When evaluating the effective SNR using EESM, for example, the effective SNR depends on the MCS (e.g., through the coefficient β in Equation [1] above), but the dependence is often weak. In LTE release 8, for example, the effective SNR varies with β(MCS) by no more than approximately 3 dB. Since the difference in (effective) SNR thresholds between MCSs is relatively large, evaluating the effective SNR at a preliminary step with a single β value enables narrowing down the search for the preferred MCS to a reduced subset of MCSs (e.g., on the order of three MCSs for LTE release 8).

MCS selection unit 160 of FIG. 6 uses this characteristic to reduce the number of evaluated MCSs. As in the previous examples, unit 160 evaluates the MCSs in a non-monotonic order of SE, i.e., not from most-spectrally-efficient to least-spectrally-efficient or vice versa. In the present example, unit 160 comprises an effective SNR calculation unit 164, which is similar to units 94 and 144 of FIGS. 3 and 140, respectively. Unit 164 calculates the effective SNR for some initial MCS denoted MCS X, e.g., using β(X) in Equation [1]. The effective SNR is used as an index to a Look-Up Table (LUT) 168. For each effective SNR, LUT 168 outputs a respective subset of MCSs that are likely to contain the preferred MCS (the MCS having the highest SE while satisfying the error rate constraint).

An MCS search unit 172 searches for the preferred MCS within the subset of MCSs that is indicated by LUT 168, this time employing the actual relevant values β(MCS). In some embodiments, unit 172 searches the subset of MCSs using the SNR-threshold-based process of FIG. 5 above. In this example, unit 160 comprises an effective SNR calculation unit 176 and a threshold vector unit 180, which are similar in operation to units 144 and 148 of FIG. 5, respectively. In alternative embodiments, MCS search unit 172 may search for the preferred MCS within the subset of MCSs using any other suitable method.

Figure 7:
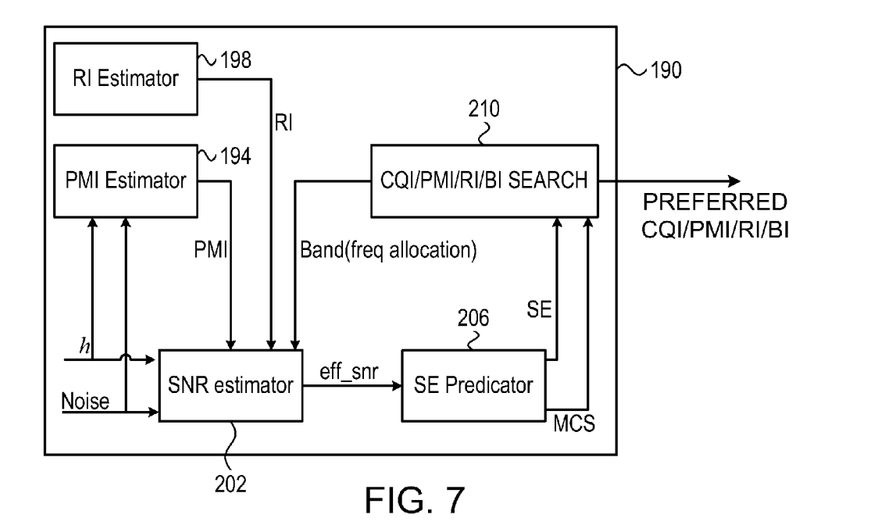
FIGS. 7 and 8 are block diagrams that schematically illustrate CSI feedback estimation units, in accordance with embodiments that are described herein.

FIG. 7 is a block diagram that schematically illustrates a CSI feedback estimation unit 190, in accordance with an embodiment that is described herein. In embodiments in which BS 28 may transmit MIMO downlink signals, the CSI feedback typically comprises a preferred PMI. When the BS uses closed loop MIMO (CL-MIMO), the CSI feedback also comprises a preferred Rank Index (RI), which indicates the preferred number of spatial layers to be transmitted by the BS. Exhaustive and accurate evaluation of all possible combinations of PMI and RI is often prohibitive. The number of combinations is especially high when the number of BS transmit antenna ports is high, and/or when the CSI feedback comprises additional feedback parameters (such as BI).

In the embodiment of FIG. 7, unit 190 initially finds a preferred PMI irrespective of other feedback parameters, and then searches for the other feedback parameters for the selected PMI. This technique significantly reduces the number of evaluated feedback parameter combinations, with little degradation in feedback accuracy. In some embodiments, unit 190 initially finds a preferred RI (in addition to the preferred PMI and irrespective of other feedback parameters). In these embodiments, unit 190 searches for the other feedback parameters for the selected PMI and RI.

In the example of FIG. 7, unit 190 comprises a PMI estimation unit 194, which estimates the preferred PMI based on the channel response and noise estimates described above. In an example embodiment, unit 194 finds the preferred PMI by computing the (one or more) eigenvectors of the channel matrix, e.g., using Singular Value Decomposition (SVD), and then identifying the precoding matrix in the codebook that is closest to these eigenvectors (with respect to some distance metric on the space of precoding matrices). Alternatively, any other suitable method can be used for selecting the preferred PMI.

In some embodiments, unit 190 further comprises a RI estimation unit 198, which selects the preferred RI. In an example embodiment, unit 198 selects the preferred RI by analyzing the eigenvectors of the channel matrix and the noise covariance in the received reference signals. Alternatively, unit 198 may use any other suitable method for selecting the preferred RI.

Unit 190 comprises an SNR estimation unit 202, which estimates the effective SNR of different MCSs. The calculation carried out by unit 202 assumes that the PMI is the preferred PMI selected by unit 194. When a-priori RI selection is also used, the calculation carried out by unit 202 assumes that the RI is the preferred RI selected by unit 198. In other words, the effective SNR calculation of unit 202 is conditioned on the preferred PMI selected by unit 194, and optionally on the preferred RI selected by unit 198. In some embodiments, unit 202 also receives an indication of a preferred subset of spectral sub-bands (BI), and assumes this subset of sub-bands in the effective SNR calculation. This technique further reduces the computational complexity of the disclosed technique.

A SE prediction unit 206 estimates the SE of the different MCSs based on the effective SNRs, as explained above. A search unit 210 selects the preferred feedback parameters (e.g., MCS, RI and/or BI) based on the SE values produced by unit 206. In particular, unit 210 selects a preferred MCS conditioned on the a-priori selected preferred PMI. The preferred PMI and preferred MCS are reported as part of the CSI feedback to BS 28.

Figure 8:
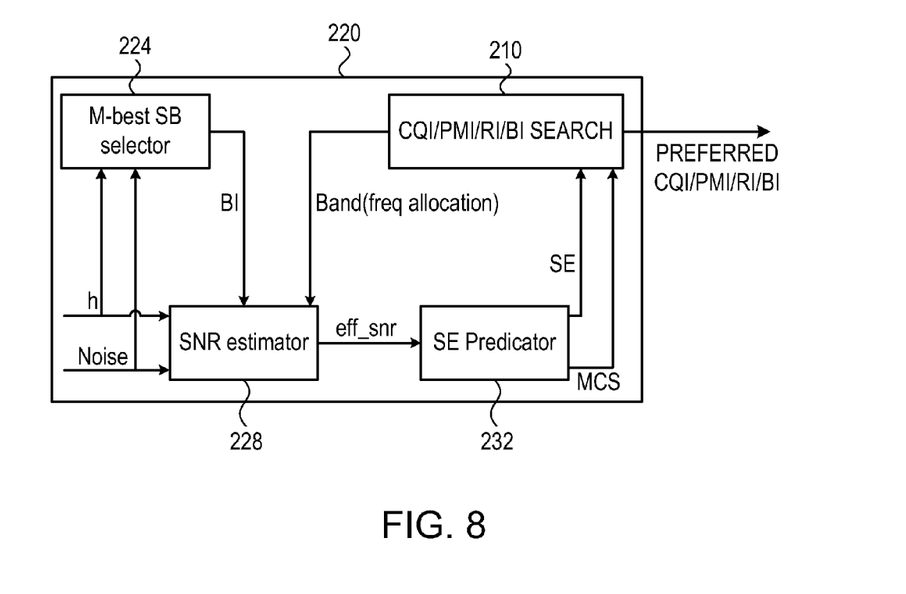

FIG. 8 is a block diagram that schematically illustrates a CSI feedback estimation unit 220, in accordance with an embodiment that is described herein. As explained above, in some embodiments the requested CSI feedback comprises a preferred subset of M spectral sub-bands (BI). Exhaustive scanning of all possible combinations of M out of N bands may be extremely computationally-intensive. In some LTE release 8 scenarios, for example, a 20 MHz band is divided into twenty-five sub-bands, and M is set to M=6. In such a scenario, exhaustive scanning would involve evaluation of $$\binom{25}{6} = 25!/6! \cdot 19! = 177,100$$

sub-band combinations.

In order to avoid such a high number of computations, in some embodiments unit 220 selects a preferred set of spectral sub-bands (BI) a-priori, irrespective of other feedback parameters. An example selection process is described further below. Then, unit 220 selects the other feedback parameters conditioned on the previously-selected subset of sub-bands. Conditioning the other feedback parameters on the a-priori selection of preferred BI causes little or no degradation in feedback accuracy.

In some embodiments, unit 220 selects the preferred subset of sub-bands by computing a respective band-specific Spectral Efficiency (SE) for each sub-band, independently of the other sub-bands. In an example embodiment, unit 220 sets a certain PMI and optionally RI, and then estimates the band-specific SE of each sub-band assuming the PMI and RI. (Note that these PMI and RI are not necessarily the preferred PMI and RI that will be selected and eventually reported as part of the CSI feedback.) Unit 220 then selects the M sub-bands having the highest band-specific SE values to serve as the preferred BI. Selecting the preferred BI based on band-specific SE rather than computing the SE jointly over each subset of sub-bands causes little or no degradation in feedback accuracy, and at the same time reduces the number of computations considerably.

In the example of FIG. 8, unit 220 comprises a sub-band selection unit 224 that initially selects the preferred subset of M spectral sub-bands (BI) based on the channel response and noise estimates. In some embodiments, unit 220 calculates a respective band-specific SE for each sub-band, and chooses the M sub-bands having the highest band-specific SE values. An SNR estimation unit 228 estimates the effective SNR of different MCSs. The calculation of unit 228 assumes that the BI is the preferred BI selected by unit 224. A SE prediction unit 232 estimates the SE of the different MCSs based on the effective SNRs. Search unit 210 selects the preferred feedback parameters based on the SE values produced by unit 232. In particular, unit 210 selects a preferred MCS conditioned on the a-priori selected preferred BI. The preferred BI and preferred MCS are reported as part of the CSI feedback to BS 28.

As described above, selection of the preferable MCS sometimes involves translation of effective SNR to BLER. In the configuration of FIG. 3, for example, SNR-to-BLER translation unit 98 holds a mapping that translates effective SNR into BLER for various MCSs. In some embodiments, however, the properties a given MCS vary from one system to another, depending on transmission parameters of the downlink data-carrying signals. In LTE release 8, for example, the actual code rate in a given MCS may vary depending on the allocated bandwidth and the reporting mode specified for the UE. The code rate may vary depending on the possible data payload types and/or the time-frequency allocation resources. The expected performance (e.g., SE and BLER) varies with code rate. Therefore, representing each MCS with a single mapping that does not consider the actual code rate variations (or other transmission parameters) may not be sufficient, and may cause degradation in feedback accuracy. The degraded feedback accuracy may in turn degrade the link adaptation quality and reduce the downlink throughput.

It is possible in principle to store multiple SNR-to-BLER mappings for each MCS, in order to take into account the various possible code rates. Such a solution, however, requires a large memory space. In some embodiments, translation unit 98 (or UE processor 44 in general) holds this information in compressed form. In an example embodiment, unit 98 holds a respective baseline SNR-to-BLER mapping for each MCS. The baseline SNR-to-BLER mapping is typically pre-calculated for a certain choice of code rate or other transmission parameters.

For each MCS, unit 98 holds one or more offset values that correspond to the various possible transmission parameters (code rates in the present example) in that MCS. Each offset value defines an offset that should be applied to the baseline mapping of that MCS in order to match a certain code rate. In an example embodiment, the offset value of a certain code rate comprises a difference between the effective SNRs that correspond to BLER=10% in the baseline mapping and in the code rate in question. In order to estimate the BLER for a certain code rate in a given MCS, unit 98 shifts the baseline SNR-to-BLER mapping of that MCS by the appropriate offset value, and then estimates the BLER using the shifted mapping. This technique reduces the memory requirements of processor 44 considerably without compromising feedback accuracy.

As explained above, in some embodiments the CSI feedback comprises a preferred number of spatial streams (also referred to as a preferred rank and denoted RI). In an embodiment, UE processor 44 averages the preferred RI over time, e.g., over multiple frames, and reports the time-averaged preferred RI to BS 28. Typically, processor 44 quantizes the time-averaged preferred RI using a certain quantization scheme, and reports the quantized value as part of the CSI feedback.

The UE, MCS selection unit and CSI feedback estimation unit configurations shown in FIGS. 1-3 and 5-8 are example configurations, which are depicted solely for the sake of clarity. In alternative embodiments, any other suitable configuration can also be used. Some UE elements that are not mandatory for understanding of the disclosed techniques have been omitted from the figures for the sake of clarity. The different elements of these units are typically implemented using dedicated hardware, such as using one or more Application-Specific Integrated Circuits (ASICs) and/or Field-Programmable Gate Arrays (FPGAs). Alternatively, some elements may be implemented using software executing on programmable hardware, or using a combination of hardware and software elements.

In some embodiments, some or all of the elements of a given UE, MCS selection unit or CSI feedback estimation unit may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
receiving reference signals in a mobile communication terminal, which is designed to receive data-carrying signals that are transmitted from a base station using one of multiple predefined Modulation and Coding Schemes (MCSs);
holding in the communication terminal one or more pre-calculated mappings between Signal-to-Noise Ratio (SNR) and error rate for one or more of the MCSs;
adjusting the pre-calculated mappings according to one or more transmission parameters of the data-carrying signals;
based on the adjusted mappings, estimating using the received reference signals respective measures indicative of actual spectral efficiencies that are achievable by the MCSs;
selecting a preferred MCS based on the estimated measures;
computing a preferred number of spatial streams and time-averaging the preferred number of the spatial streams; and
sending to the base station feedback that is indicative of the preferred MCS and further indicates the time-averaged preferred number of the spatial streams.

2. The method according to claim 1, wherein selecting the preferred MCS comprises choosing the MCS having a highest spectral efficiency while satisfying a constraint on an error rate of the data-carrying signals.

3. The method according to claim 2, comprising holding respective pre-calculated Signal-to-Noise Ratio (SNR) thresholds above which the MCSs satisfy the constraint, wherein selecting the preferred MCS comprises estimating respective effective SNRs for the one or more of the MCSs and comparing the effective SNRs to the respective SNR thresholds.

4. The method according to claim 1, wherein estimating the measures comprises estimating respective effective Signal-to-Noise Ratios (SNRs) for the MCSs, and estimating the measures of the actual spectral efficiencies based on the effective SNRs.

5. The method according to claim 4, wherein estimating the measures comprises applying an Exponential Effective Signal to Interference and Noise Ratio Mapping (EESM) to estimate the effective SNRs.

6. The method according to claim 4, wherein estimating the effective SNRs comprises calculating input SNRs by processing the received reference signals, limiting amplitudes of the input SNRs, and calculating the effective SNRs based on the input SNRs having the limited amplitudes.

7. The method according to claim 4, wherein estimating the measures comprises averaging the effective SNRs, and calculating the measures based on the averaged effective SNRs.

8. The method according to claim 4, wherein estimating the effective SNRs comprises calculating input SNRs by processing the received reference signals, calculating the effective SNRs based on the input SNRs, and scaling the effective SNRs based on a ratio between a maximum and a minimum of the input SNRs.

9. Apparatus, comprising:
- a receiver, which is configured to receive reference signals from a base station, and to receive from the base station data-carrying signals that are transmitted using one of multiple predefined Modulation and Coding Schemes (MCSs);
- a processor, which is configured to hold one or more pre-calculated mappings between Signal-to-Noise Ratio (SNR) and error rate for one or more of the MCSs, to adjust the pre-calculated mappings according to one or more transmission parameters of the data-carrying signals, to estimate, based on the adjusted mappings and using the received reference signals, respective measures indicative of actual spectral efficiencies that are achievable by the MCSs, to select a preferred MCS based on the estimated measures, to compute a preferred number of spatial streams and to time-average the preferred number of the spatial streams; and
- a transmitter, which is configured to send to the base station feedback that is indicative of the preferred MCS and is further indicative of the time-averaged preferred number of the spatial streams.

10. The apparatus according to claim 9, wherein the processor is configured to select the preferred MCS by choosing the MCS having a highest spectral efficiency while satisfying a constraint on an error rate of the data-carrying signals.

11. The apparatus according to claim 10, wherein the processor is configured to hold respective pre-calculated Signal-to-Noise Ratio (SNR) thresholds above which the MCSs satisfy the constraint, and to select the preferred MCS by estimating respective effective SNRs for the one or more of the MCSs and comparing the effective SNRs to the respective SNR thresholds.

12. The apparatus according to claim 9, wherein the processor is configured to estimate respective effective Signal-to-Noise Ratios (SNRs) for the MCSs, and to estimate the measures based on the effective SNRs.

13. The apparatus according to claim 12, wherein the processor is configured to estimate the measures by applying an Exponential Effective Signal to Interference and Noise Ratio Mapping (EESM) to estimate the effective SNRs.

14. The apparatus according to claim 12, wherein the processor is configured to calculate input SNRs by processing the received reference signals, to limit amplitudes of the input SNRs, and to calculate the effective SNRs based on the input SNRs having the limited amplitudes.

15. The apparatus according to claim 12, wherein the processor is configured to average the effective SNRs, and to calculate the measures based on the averaged effective SNRs.

16. The apparatus according to claim 12, wherein the processor is configured to calculate input SNRs by processing the received reference signals, to calculate the effective SNRs based on the input SNRs, and to scale the effective SNRs based on a ratio between a maximum and a minimum of the input SNRs.

17. A mobile communication terminal comprising the apparatus of claim 9.

18. A chipset for processing signals in a mobile communication terminal, comprising the apparatus of claim 9.

* * * * *